GEORGE W. LOOMIS.
Improvement in Brakes for Vehicles.

No. 118,465.   Patented Aug. 29, 1871.

Witnesses.
H. Poole
A. M. Warfield

Inventor.
George W. Loomis
By J. B. Woodruff
Attorney of Record

UNITED STATES PATENT OFFICE.

GEORGE W. LOOMIS, OF TORRINGTON, CONNECTICUT.

IMPROVEMENT IN BRAKES FOR VEHICLES.

Specification forming part of Letters Patent No. 118,465, dated August 29, 1871.

*To all whom it may concern:*

Be it known that I, GEORGE W. LOOMIS, of Torrington, in the county of Litchfield and State of Connecticut, have invented certain new and useful Improvements in Self-Acting Brakes for Ox-Carts, Farm-Wagons, and other Wheel Vehicles; and the following is a full, clear and exact description of the same, reference being had to the accompanying drawing making a part of this specification, in which—

Figure 1:
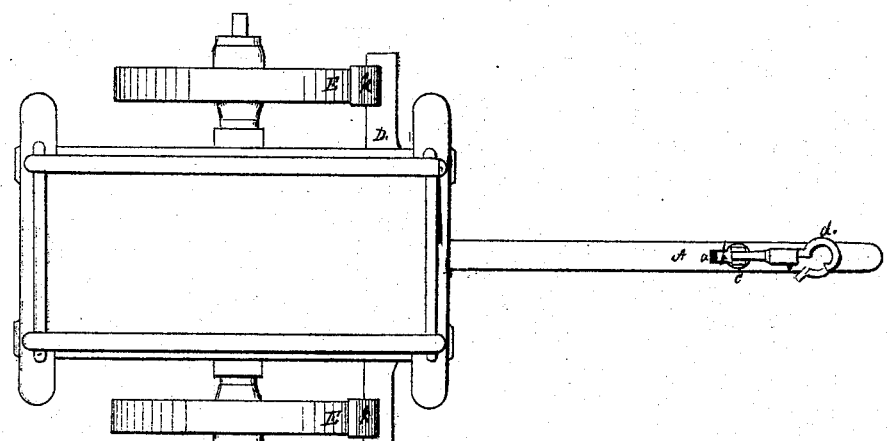
Figure 2:
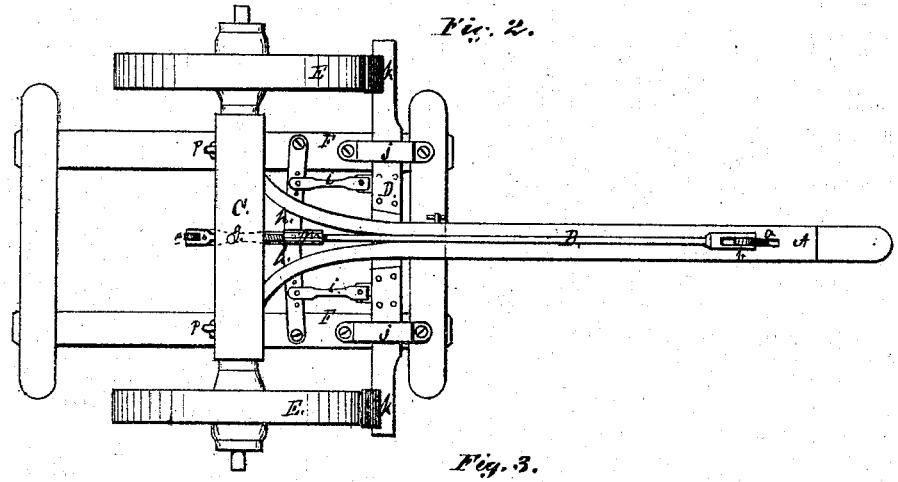
Figure 3:
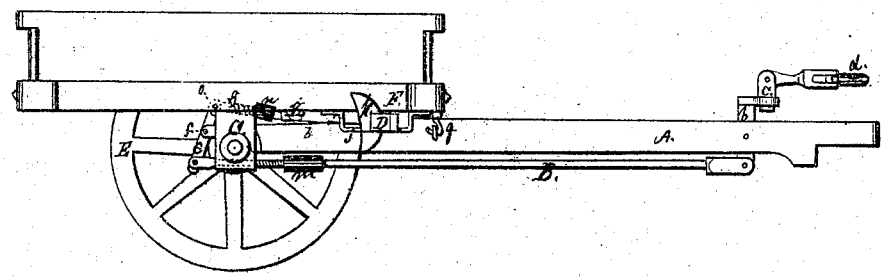

Figure 1 represents a plan or top view of an ox-cart, showing the brakes and bar to which they are attached, to operate on the front of the wheels; also, a top view of the connecting-link and snaffle-ring by which the apparatus is connected and disconnected to the staple in the ox-yoke. Fig. 2 is an under-side view of the ox-cart, showing the brake-bar with its two couplings, compound levers, and connecting-rods as arranged to operate the brakes by the forward pressure of the load. Fig. 3 is a side elevation of the same, showing a section through the whole brake mechanism, longitudinal with the central portion of the cart.

My invention is particularly designed to obviate a difficulty which has ever been experienced in working oxen in a cart in hilly countries where the fields are sloping and the incline very steep. My improvement consists in the construction, arrangement, and combination of a series of compound levers, links, adjustable coupling-rods, and snaffle-hook or ring for connecting and disconnecting the brake apparatus to the staple of the neck-yoke in such a manner as to be self-acting by the pressure of the cart or vehicle forward, and is easily detached for backing up, while it admits of the tilting and dumping of the cart-body as freely as though no brake apparatus were attached.

In the forward end of the tongue or neap A of a common ox-cart or wagon I make a mortise, $a$, vertically, in which is pivoted a lever, $b$, having on its top a swivel-stud, $c$, in which a snaffle-hook or ring, $d$, is hinged, for coupling into the staple of any ordinarily-constructed neck-yoke used for hitching a pair of oxen or horses to a cart or wagon. The hook or ring $d$ is hinged so as to be easily opened, and held securely together by a snap-spring. To the lower end of the vertical lever $b$ is attached the connecting-rod B, which is placed under the neap A and runs parallel with it, and extends through a hole made near the lower edge of the cart-axle C, where it connects with another vertical lever, $e$, that is pivoted to a stud, $f$, in the rear of the axle C. To the top end of the lever $e$ is a coupling-bar, $g$, which connects it with a double or jointed lever, $h\ h$, which also connects the brake-bar D by two link-bars, $i\ i$, so that it is moved up toward and from the front of the cart-wheels E E in a direct line parallel with the cart-axle C, the brake-bar D being secured in position to the under side of the frame-work of the cart-body F by metal brackets $j\ j$, so that the brake-blocks $k\ k$ are brought to bear squarely and firmly against the front of the wheels E just above the line of the axle C, making the pressure downward, and giving the whole weight of the load to exert its power to produce friction on the periphery of the wheels. The connecting-rod B and also the coupling-bar $g$ are provided with buckle-joints $m$ and $n$, so that the brake-blocks $k\ k$ can easily be adjusted to the wear by a turn or two of the buckle-nut $m$. The joint $o$ of the vertical lever $e$ and coupling-bar $g$ being in a line with the hinges P P that hold the body F to the axle C, enable the cart-body to be tilted for dumping without interfering in the least with the levers or any portion of the brake apparatus, the cart-body being held from dumping by the hook and staple $q$, or any other of the devices in ordinary use.

The arrangement of the self-acting brake and the mechanism above described can be easily attached to any of the ox-carts now in use without altering or changing anything, but simply fitting the parts, which are made of malleable cast-iron, so that the cost is but a trifle compared to the advantages it possesses over those without it.

When carts or wagons are provided with my improvements, as above described, (it is not necessary that it be used unless required,) by not coupling the snaffle-ring $d$ with the staple of the yoke it does not operate at all, and when it is necessary to back up the cart for any purpose the connection is easy and should be uncoupled.

What I claim as my invention is—

The combination of the compound-lever mechanism, consisting of the snaffle-hook $a$, swivel $c$, rod B, buckle-joint $m$, lever $e$, bar $g$, jointed lever $h\,h$, link-bar $i\,i$, and brakes $k\,k$, when the said mechanism is so arranged as to operate the brakes on the front side of the wheels E E, and admit of the free action of the cart-body for tilting and dumping, as herein shown and described.

In testimony whereof I hereunto subscribe my name.

GEO. W. LOOMIS.

Witnesses:
 GIDEON H. WELCH,
 CHAS. H. SEYMOUR.